United States Patent Office 3,728,132
Patented Apr. 17, 1973

3,728,132
PROCESS FOR THE PRODUCTION OF
FOODS AND DRINKS
Naoto Tsuyama, Mamoru Hirao, Masashi Kurimoto, Kaname Sugimoto, and Masakaza Mitsuhashi, Okayama, Japan, assignors to Hayashibara Company, Okayama, Japan
No Drawing. Filed Nov. 17, 1970, Ser. No. 90,418
Claims priority, application Japan, Nov. 17, 1969, 44/91,980; Jan. 14, 1970, 45/3,977; Mar. 28, 1970, 45/26,270
Int. Cl. A23l 1/26
U.S. Cl. 99—141 R
12 Claims

ABSTRACT OF THE DISCLOSURE

The present invention relates to a process for the production of various foods and drinks utilizing previously unknown sweeteners, comprising the addition of sucrose or sugars containing fructose to starch hydrolyzate, subjecting the mixture to actions of Bacillus macerans amylase, bacterial sacchalogenic-α-amylase (B.S.A.), fungal α - amylases, or pancreas amylase, producing oligosaccharide syrups containing transferred fructose and then utilizing the syrups as a material for the production of the said foods and drinks.

---

The present invention relates to a process for the production of various foods and drinks utilizing previously unknown sweeteners, comprising the addition of sucrose or sugars containing fructose to starch hydrolyzate, subjecting the mixture to actions of Bacillus macerans amylase, bacterial sacchalogenic-α-amylase (B.S.A.), fungal α-amylases, or pancrease amylases, producing oligosaccharide syrups containing transferred fructose and then utilizing the syrups for the production of the said foods and drinks.

Conventionally and generally foods and drinks were and are sweetened mostly with sucrose or glucose, and blending the said sugar with one or more than two of the following: starch syrups, invert sugar, isomerized sugar, and artificial sweeteners. The use of most of the artificial sweeteners have been restricted by Food Acts in many countries. Accordingly it has become impossible to satisfy the palatabilities of modern generations who were satiated with intensive sweetness, unless they compromise with the intensive and simple sweetness of sucrose. From the point of view of the phyical properties required for a sweetener, the crytsallization properties and unstabilities of glucose and fructose to heat and nitrogenous compounds become obstacles in the production of foods, drinks and confectioneries of western and Japanese style.

The inventors succeeded in developing a process for the production of an ideal sweetener with excellent sweetness, desirable viscosity, extremely low crystallization properties and consisting of oligosaccharides containing fructose on their molecular end—oligoglucosyl fructose—with utilization of the transferring action of amylase.

The sweetener is produced by subjecting liquefied starch to which is added sucrose or sugars containing fructose (invert sugar, partially invert sugar, isomerized dextrose, honey, or date sugar etc.) as an acceptor or acceptors to the action of the transfer-enzyme (Bacillus macerans amylase, bacterial saccharogenic amylase, or fungal α-amylase etc.).

These transfer-enzymes hydrolyze the liquefied starch and simultaneously transfer the hydrolyzates of the liquefied starch to sucrose or fructose, and then sugars of oligosaccharides which are bonded with fructose on their reducing ends are obtained.

The produced oligosaccharides consisted of GF (sucrose), G2F, G3F ... G4F (GF represents the glucosyl fructose residues), their molecular weight was relatively small and had a lower viscosity than those of common starch syrups and facilitated processing in the confectionery industry.

Since the transfer degree is about 20–50%, the reaction mixture contains unreacted molecules of sucrose or fructose, transferred sugar and oligosaccharides. The transferred sugar imparts an intensive and decent sweetness which is one of the characteristics of the sugar. The sweetness of the mixed sugar harmonizes desirably with those of oligosaccharides displaying an excellent sweetness. In addition the degree of sweetness is controllable by varying the mixing ratio of sucrose or sugar which contains fructose to starch. In other words in case the ratio of sugar acceptors becomes higher, the contents of transferred sugar and residual sugar increase, as well as the sweetness of the resultant starch syrups becoming more intensive.

In case sucrose is used as an acceptor, unstable and reducing monosaccharides are absent in the present sweetener, thus the sweetener is a mixture comprising non-reducing and stable oligoglucosyl fructose, sucrose and low reducing oligosaccharides. Especially in case the concentration of starch hydrolyzate is high and the mixing ratio of an acceptor is near to 1, the amount of reducing sugars, products of reaction shows no increase. Therefore the syrup has a high heat stability close to sucrose and much higher than that of glucose. There is neither fear of coloration due to the Maillard reaction which is a reaction of sugars with organic nitrogenous compounds (e.g. protein), nor formation of carbon dioxide gas by the Strecker reaction. Therefore the product is a preferable additive for the production of canned meat, sweetened chestnuts, in which gas formation should be avoided as well as for hard candies which require heating and concentration procedures. Processes for the production of hard candies, jellies, white bean paste and sweetened chestnuts will be described later in the examples. Candy tests on a high maltose syrup (Maltrup, a registered brand and product of Hayashibara Kabushiki Kaisha, Okayama, Japan; maltose content 50%, stable to heat and nitrogenous compounds), a mixture of Maltrup and sucrose (1:1) and the present sweetener were performed. These were cooked separately in copper pans. The coloration temperature of the sweetener was 160° C. whereas those of the others were less than 150° C.

Therefore the sweetener is stable with a desirable viscosity and was found to be a preferable material for the production of candies. The above is another characteristic of the present invention. Whereas sucrose crystallizes, the sweetener is non-crystallizable owing to the fact that it is an oligosaccharide analogue mixture. Therefore there is no fear of crystallization when used in products such as candies, Yokan etc., in which large amounts of sweetener are used. Simultaneously the sweetener is highly effective in preventing crystallization of syrups with a high content of sucrose, or glucose, or maltose. Therefore preferable results were obtained by using the sweetener in condensed syrups, Yokan, Kasutera (sponge cakes), hard candies etc.

With regard to viscosity, because the sweetener contains as its main constituent oligosaccharides, it does not display a high viscosity due to high molecular dextrins as found in common starch syrups, higher than that of sucrose. The sweetener imparts to food products a desirable level of sweetness which is imparted by sucrose and a desirable viscosity which cannot be offered by sucrose. Therefore the sweetener provides food products which stimulate consumer's appetites by rendering to canned fruit, canned meat, concentrated syrup etc. a slight but preferable viscosity as well as improving the gloss of the products.

The results of the viscosity value of the sweetener as determined with a B model viscometer is shown in Table 1 with those of a mixture (maltrup+sucrose; 4:3) and sucrose. The viscosities were determined at concentration D.S. 75:5% (D.S. represents dry substance), temperature 19–79° C.

TABLE 1.—VISCOSITIES OF SWEETENERS

[Centipoise=cp.]

| Temperature (° C.) | Material | | | |
|---|---|---|---|---|
| | The present sweetener | Maltrup plus sucrose | Sucrose | Maltrup |
| 19 | 7,310 | 3,720 | 2,470 | 14,700 |
| 30 | 2,140 | 1,210 | 950 | 10,000 |
| 40 | 1,160 | 460 | 420 | 4,200 |
| 50 | 585 | 342 | 220 | 2,100 |
| 60 | 254 | 189 | 120 | 750 |
| 70 | 146 | 111 | 70 | 350 |
| 80 | 100 | 84 | 50 | 200 |

In addition the sweetener is obtainable in powder form with a low hygroscopicity. More particularly, the sweetener can be formed into candy balls by condensation by following the methods described before, then the sweetener can be formed into amorphous powder with a moisture content of 2–5% as well as into hard candies with low hygroscopicity. Thus the sweetener is available which has many advantages such as: being an effective powdered stabilizer, and a moisture preventive agent, and improving the dissolving speed of products in which it is used, as well as imparting sweetness and viscosity to the products when admixed or blended in powdered soup, juice, instant coffee and black tea, powdered infant foods and other foods and beverages. Table 2 shows test results hygroscopicities of hard candies in which the sweetener was used.

TABLE 2.—HYGROSCOPIC TEST

[Hygroscopicities after 40 hours (percent)]

| Relative humidity | Material | | |
|---|---|---|---|
| | The present sweetener | Maltrup | Maltrup plus sucrose |
| Percent: | | | |
| 60 | 0.8 | 0.9 | 1.21 |
| 70 | 2.0 | 2.2 | 2.6 |
| 80 | 4.5 | 5.4 | 5.4 |

The above table shows that the hygroscopicity of the sweetener was negligible.

Another advantage of the sweetener is as follows. In case sugars containing fructose are used as acceptors, the sweetener is a sugar mixture of oligosaccharides produced from starch hydrolyzates by hydrolysis with amylase, oligoglucosyl fructose, and unreacted sugars, the sugars mutually prevent crystallization and thus the sweetener becomes difficult to crystallize, and can be used at high concentrations. In addition since the sweetener has a high content of residual glucose of fructose, the sweetener imparts a high sweetening and is effective in improving the palatability and maintaining the quality of the products wtihout fear of crystallization when the sweetener is used in various confectioneries of western and Japanese style. Further, since the chemically unstable fructose used in the present invention is converted into stable oligoglucosyl fructose by bonding, the stability of the sweetener to heat and nitrogenous compounds is increased.

Because the sweetener is a mixture of various sugars, it has superior moisture and flavor retentive properties. When used in western and Japanese style confectioneries, the sweetener renders a dampish moisture to the products and is effective in maintaining the desirable properties of the products.

Accordingly this non-crystallizable and superior sweetener is preferable for the production of hard candies, caramels, marbles, etc., and imparts a different taste to the products, as well as being suitable for the production of canned fruits, sweetened meat, condensed juice, and fruit juice in general. Also its moisture retentive properties and hard crystallizable-property make the sweetener a preferable sweetener to be used in Japanese style confectioneries, especially bean paste ("An"), Yokan, as well as western style sponge cakes. Since the sweetener can be used in a liquid sugar form which is hardly crystallizable, the products in which it is used have long shelf lives, and their moisture and desirable flavor can be maintained for prolonged periods in desirable degrees. The present invention will be illustrated by examples. All parts and percentages are by weight unless stated otherwise.

EXAMPLE 1-a

Process for the production of sweeteners utilizing an enzyme from *Bacillus macerans*

10 kg. of sweet potato starch was washed with water and a 10% aqueous suspension was prepared. To the suspension was added 0.2% of α-amylase (a product of Nagase Sangyo K.K.) per gram starch, gelatinized by heating to 80° C. then incubated at 65° C. for 3 hours. The reaction was discontinued by heating upon attaining D.E. 16% (D.E. represents dextrose equivalent). The solution was divided equally into 3 parts and the following fractions were prepared by admixing sucrose.

A fraction: (⅓ volume liquefied starch=3.3 kg. starch) +4.5 kg. sucrose

B fraction: (⅓ volume liquefied starch=3.3 kg. starch) +2.3 kg. sucrose

C fraction: (⅓ volume liquefied starch=3.3 kg. starch) +1.5 kg. sucrose 1.5 l. of culture filtrate of *Bacillus macerans* (3 conversion units per ml.) were added to each fraction separately. The fractions were incubated at 40° C. for 2 days. After incubation there was added to the fractions 0.5% active carbon per solid, decolorized purified with ion exchangers, and concentrated. Thus colorless, odorless syrups (moisture contents 15%) were obtained. The syrups were defined as products A, B and C.

Fine granular powders (moisture contents 3%) were obtained by spray drying large volumes of treated solution (concentration 70%). These products which had extremely low hygroscopicities, could be handled with ease. These powders were defined as products As, Bs and Cs.

EXAMPLE 1-b

Process for the production of sweeteners utilizing enzyme of *Bacillus macerans* and fructose Roots and tubers starch, such as, potato starch, sweet potato starch, cassava starch, or cereal starch, such as corn starch, waxy corn starch, were used as starting material. To a starch suspension (concentration 30–45%) was added 0.2% of oxalic acid per starch, induced into an autoclave charging raw steam, where it was gelatinized. Then the slurry was heated at 2 kg./cm.$^2$ pressure for 10–15 minutes, to D.E. 20–23%, neutralized with calcium carbonate to pH 5.0, precipitated and filtered.

Subsequently a starch suspension was liquefied by the same method as Example 1-a adding 0.2% liquefying enzyme per starch and incubation at 80–90° C. to D.E. 20–23%. The solution was inactivated with boiling.

In case of enzymatical liquefaction of cereal starch, a 20–35% starch suspension was gelatinized at 130–170° C. under stirring conditions, cooled rapidly, 0.1–0.2% liquefying enzyme per starch was added, and incubated at pH 6.0, 80–70° C. to D.E. 15–25% and then inactivated with boiling.

To the thus obtained liquefied solutions were added invert sugar, or partially invert sugar containing sucrose, or isomerized dextrose, or honey, or date extraction to give the mixture of total solid contents 35–45%. To the mixtures were added 2 units of *Bacillus macerans* amylase per gram starch and incubated at pH 6.0, 55° C. for 1–3 days, and then inactivated by heating. The solution was decolorized and purified with active carbon and ion exchangers and then concentrated. Methods of preparation of various sugars are shown in Table 3.

Powdered products (moisture contents 1–3%) were obtained by spray drying in hot air (about 180–200° C.) sugar solutions with concentration of 50–75%.

TABLE 3.—PRODUCTION DATA OF NEW SWEETENERS

| Product number | D | E | F | G | H | I |
|---|---|---|---|---|---|---|
| Starches used | Sweet potato | Sweet potato | Potato | Corn | Sago | Sweet potato. |
| Starch concentration | 40 | 40 | 40 | 35 | 40 | 40. |
| Methods of liquefying | Enzyme | Enzyme | Acid | Enzyme | Acid | Acid. |
| Liquefying D.E. (percent) | 22 | 22 | 20 | 20 | 22 | 21. |
| Mixed sugar ratio to starch | Fructose, 1 part. | Fructuose, 2 parts. | Invert sugar (S–34), 1 part. | Purified hydrol (S–30), 2 parts. | Date sugar, 3 parts. | Isomerized dextrose. ½ part. |
| Reaction time (hr.) | 72 | 72 | 60 | 48 | 48 | 60. |
| Total solid content | 40 | 40 | 45 | 45 | 45 | 40. |
| Transferring (percent) | 24.9 | 22.5 | 25.0 | 20.4 | 16.0 | 50.0. |
| Sweetness | Medial | Medial strong | Medial | Strong | Strong | Weak. |
| Viscosity | High | Middle | High | Middle | Low | High. |
| Crystallization | None | None | None | None | None | None. |
| Cyclodextrins (turbidity) | 0 | 0 | 0 | 0 | 0 | 0. |

Partially inverted, sugar S–34: contains 34% sucrose.
Isomerized dextrose: contains 37% fructose obtained by isomerizing glucose with isomerase of Lactobacillus.

EXAMPLE 1–c

Process for the production of sweeteners utilizing bacterial saccharogenic amylase (BSA) or α-amylase Any variety of starch may be used in this example. To a starch suspension (concentration 30–35%) was added organic acid, such as oxalic acid, or inorganic acid, such as hydrochloric acid and sulphuric acid, heated at 2 kg./cm.$^2$ about 20 minutes to D.E. 10–40%, neutralized to pH 5.0 and precipitates were filtered. Subsequently a starch suspension was enzymatically liquefied by the same method as described in Example 1–b and thus a liquefied solution was obtained.

To the thus obtained liquefied solution were added sucrose, or fructose, invert sugar, partially invert sugar, isomerized dextrose, honey, or date sugar. The mixture was adjusted to give a total solid contents 25–45%, and then was added 1–5 units of transfer enzyme per gram starch.

In this example were used a bacterial saccharogenic amylase (B.S.A., a product of Ueda Kagaku K.K.), Takadiastase ( a fungal α-amylase, a product of Sankyo Seiyku K.K.), or α-amylase of *Aspergillus niger* NRRl 337. The reactions were carried out at 4060° C. for 1–3 days to the completion of transferring degree. These reaction solutions were decolorized and purified with active carbon and ion exchangers, and then concentrated.

EXAMPLE 2–a

Process for the production of canned fruit

Ripe peaches were selected and immersed in a 0.05% erythrosine dye solution for 15 minutes, and the air present in the sarcocarps was degassed. The wax substance was dissolved and stained with a coloring matter. The pH of the employed solution was adjusted to 4.0.

After the sarcocarps were washed with water and the unstained coloring matter was washed off, the peaches were immersed in a 30% solution of the sweetener, M, G, H or A, then immersed in a 50% solution of the sweetener to allow the sugars to permeate sufficiently into the sarcocarps. Then the sarcocarps were collected and canned.

The sweetener solution, concentration 30%, was charged into the products which were subsequently exhausted, seamed and sterilized at 100° C. Tests conducted upon opening the cans after 1 month resulted in the findings that the yield of solid were excellent, sarcocarps maintained their glossy and regular shapes, and the products had a harmonized sweetener which proved that the sweetness was an effective sweetener with superiorities for canned fruit.

EXAMPLE 2–b

Process for the production of jelly beans

Formula: centers were prepared by mixing 90% of the sweetener A, J, or D, 8% corn starch and 2% agar. 60 parts of the center, 30 parts of powdered sugar, 4 parts of sucrose, 5 parts of the powdered sweetener (A, K or G), and suitable amounts of flavor and color were blended.

Agar was softened by submersion in water and then dissolved by heating. The sweetener A, J or D was added and heated to 80° C. A small amount of starch slurry was added to the resultant which was cooked to 105° C. The solution was cast into starch modes and allowed standing in a drying room of 70° C. overnight, then the starch was sifted.

The resultant centers were placed in a revolving pan,

TABLE 4.—PRODUCTION DATA OF NEW SWEETENERS

| Product number | J | K | L | M |
|---|---|---|---|---|
| Starches used | Corn | Corn | Sweet potato | Sweet potato. |
| Starch concentration, percent | 35 | 40 | 40 | 40. |
| Methods of liquefying | Enzyme | Acid | Enzyme | Enzyme. |
| Liquefying D.E. | 5 | 15 | 10 | 17. |
| Transfer-enzyme | ASP niger | ASP niger | BSA | BSA. |
| Units used per gram starch | 4 | 5 | 3 | 3. |
| Sugar acceptor ratio to starch | Sucrose, 1 part | Sucrose, 3 parts | Fructose, 1 part | Invert sugar, 3 parts. |
| Transferring degree (percent) [1] | 35 | 25 | 32 | 22. |
| Sweetness | Medial | Strong | Medial | Strong. |
| Viscosity | Middle | Low | Middle | Low. |
| Sugar composition | Sucrose transferring ring sugar oligosaccharide. | Low | do | Sucrose glucose fructose transferring-sugar oligosaccharide. |
| Crystallization | Low | Middle | Low | Low. |

[1] Transferring degree (percent) = $\frac{\text{Total fructose of oligoglucosyl fructose}}{\text{Total fructose in the reaction mixture}} \times 100$ The sweetener is a liquid sugar with a solid contents 75%. However it is preferable to use a powdered form (moisture contents 3–5%) of the sweetener obtained by spray drying.

where they were sprinkled with a solution comprising 3 parts of sucrose, 5 parts of the powdered sweetener A, K or G, and 2 parts of water, then sanded with powdered sugar. The procedure was repeated to give a desirable thickness, then dried upon glossing. Thus, the replacement of sucrose and starch syrup with the sweetener provides centers with a desirable biting property and a decent sweetness as well as a process for the production of jelly beans wherein the drying procedure can be shortened.

EXAMPLE 2-c

Process for the production of chewing gum 20 parts of gum base, 40 parts of powdered sugar, 40 parts of powdered sweetener A, B, G or L was admixed with sufficient amounts of flavor and color, heated and dissolved following usual methods. The resultant was rolled, kneaded, extended to a desirable thickness, cut with a cutter and the sticks were allowed to dry overnight. The sweetener provides chewing gums with a decent sweetness of durability and the required and desirable properties for chewing gums.

EXAMPLE 2-d

Process for the production of frozen desserts and ice creams

Formula: 7 kg. of 40% cream, 20 kg. of sweetened condensed whole milk, 46 l. of whole milk, 2 kg. of skim milk, 6 kg. of the powdered sweetener C, J or D, and 0.3% of stabilizer.

Replacement of over 50% of sucrose with the sweetener, imparts a sweetness with a body, the oligosaccharides and transferred sugar present in the sweetener act as stabilizers, and thus the amount of stabilizers is reducible. The process is as follows. The ingredients are completely dissolved, heated and sterilized by heating at 66-75° C. for 30 minutes, homogenized with a homogenizer, rapidly cooled at 3-4° C., allowed aging overnight, and then frozen. Thus the products having a high melting point as well as improved flavor and palatability are obtainable.

EXAMPLE 2-e

Process for the production of sponge cake

Sucrose, eggs, and soft flour were used as ingredients. Cakes with soft and damp textures were obtained by replacing over 50% of sugar with the sweetener A, K, M, G or H. The oligosaccharides present in the sweetener impart to the cakes a desirable viscosity and a moisture retentive property, thus products with desirable shelf lives are obtainable. The process is as follows.

To the yolks was added the sweetener solution (moisture contents 30%) and small amounts of shortening oil and brandy, and the mixture was mixed sufficiently. White of eggs were beaten into bubbles, continuously were stirred while adding the above mixture. Dough was prepared by quickly admixing sifted flour. The dough was poured into a pan covered with a sheet of paper, and baked in an oven at about 300° C. for 40 minutes. The paper was removed quickly from the baked product. The cake was processed with butter cream. The product had a desirable dampness, and a fine texture. In addition the product could be stored for a period of 1.5-2.0 times of the storage period of cakes in which sucrose was used exclusively.

EXAMPLE 2-f

Process for the production of condensed juice

To 1,000 ml. of condensed juice (Bx. 55°, citric acid 4.5%) was added 250 ml. of 5% citric acid solution, 50 ml. of emulsified flavor, 150 ml. of orange essence, and a suitable amount of coloring reagent, then to the mixture was added water to give a total volume of 2,000 ml. 15 kg. of the powdered sweetener A, K, M, G, H or E and water were added to the juice base to be 28 kg. The condensed juice had a decent sweetness superior to sucrose and a desirable viscosity. There was neither crystallization nor discoloration during storage. The flavor of natural fruit juice was well maintained and thus a high quality beverage was obtained.

EXAMPLE 2-g

Process for the production of instant coffee

The maintenance of the original flavor of coffee is an important factor in the production of instant coffee. Condensation and drying of coffee extract solution were carried out by freeze drying. However the pulverizing procedure could be facilitated by the addition of any of the sweeteners J, I, C or D. More particularly, coffee extract solution was concentrated at the lowest temperature possible under reduced pressure to a concentration of D.S. 30%, then the sweetener was added 50-100% per solid. The mixture was concentrated to D.S. 50% at lower than 50° C., and then freeze dried. The addition of the sweetener was effective in rendering a mild and harmonized sweetness to the product as well as rendering a slight viscosity.

In addition the addition was effective in facilitating drying and stirring condition of the viscous concentrated coffee.

The addition of the sweetener reduced the viscosity of coffee extract to a moderate degree and thus the coffee extract formed into porous granules which dried rapidly and could be pulverized with ease.

Moreover spray drying could be carried out with ease. Thus an instant coffee powder with relatively low hygroscopicity and an improved water solubility was obtained.

EXAMPLE 2-h

Process for the production of instant soups

Usually instant soups are prepared by using corn starch, dry milk (powdered milk) as its main ingredients and adding meat extract, vegetable juice, and vegetable powder as well as sucrose and seasonings. The addition of the sweetener of this invention imparts to the soup products a delicious taste, different from the one which sucrose imparts, and a desirable viscosity. Moreover the addition facilitates pulverization of the products, and also is effective in restraining their hygroscopicities.

An example is as follows. 10 parts of corn starch, 5 parts of meat extract, 7 parts of condensed vegetable juice, 10 parts of powdered milk, 3 parts of salt, 5 parts of the powdered sweetener J, L, C or D, 1.5 parts of seasoning, 2 parts of vegetable powder, 4 parts of butter, and a suitable amount of spices were used in the present example. The ingredients with high water contents were concentrated under reduced pressure to a concentration of D.S. 50%. Then 5 parts of the sweetener was added as well as butter, vegetable powder, powdered milk and a small amount of sugar ester. The mixture was mixed thoroughly, homogenized and spray dried. The resultant was spray dried with paralled hot air of 150° C. The product had a moisture content of 2% and a yield of about 80%. The hygroscopicity of the product was relatively low. The sweetness was tasty and well harmonized. In addition the product had an excellent water solubility.

EXAMPLE 2-i

Process for the production of breads

Tests on breads using the sweetener showed that breads which were superior to common products are obtainable; more desirable fermentation, more desirable residuary sweetness, finer textures and longer shelf lives. In this example 100 g. of flour, 2 g. of yeast, and 5 g. of the sweetener A, K, L, M, E, G, or H were used.

Baking conditions were as follows:

Inorganic food—0.1 and 60%
Fermentation time—2 hours at 26° C.
Aging and floor time—15 minutes
Bench time—15 minutes
Baking time—35 minutes Weights, volumes and crust colors of the products made under the above conditions had a few differences but no great differences were noticed. The texture of crumbs, feeling and baking colors of crusts of these products were superior and the colors of crumbs of the products had no differences. Shelf life test with a compressimeter showed that the products had longer shelf lives of 30–50% than that of the common breads. Flavor, especially the aroma of the breads were improved. In addition desirable residuary sweetness gave characteristics to the products in sweetness and flavor. Using the sweetness over 15%, residuary sweetness improved the properties of sweetened breads.

EXAMPLE 2–j

Process for the production of hard candies

Usually high quality candy drops are produced by molding a mixture comprising sucrose as its main ingredient, a small amount of starch syrup, with the addition of coloring reagent, flavors and organic acids.

The utilization of the sweeteners adjust the sweetness of the products. In addition the sweetener imparts to the products decent sweetness, biting property, and brittleness as well as preventing crystallization and improving the transparency and gloss of the products.

The sweetener A, D or K was concentrated in a vacuum pan at 130° C. and placed on a cooling pan where there was added desirable amounts of organic acids, flavor and coloring reagents. At over 80° C. the mixture was formed into candy drops by applying a roller. It was then cooled, screened and stored. The drops were formed with ease. The drop product had no fear of sticking or being hygroscopic. Thus candy drops with improved transparency, biting properties and decent sweetness are obtainable.

EXAMPLE 2–k

Process for the production of sweetened condensed milk

After adjustment of the fat content of milk, it was heated and sterilized at 80° C. in a sterilizer. Caution was taken to carry out condensation at the lowest temperature possible to prevent deterioration of the milk. Before completion 16% of the sweetener M, K, A or B per milk was poured into the milk. When the mixture reached the point of moisture content 25.5–26.5%, condensation was discontinued. The obtained condensed milk had a desirable viscosity, and its deterioration during storage was extremely low. After condensation the condensed milk was transferred into a cooler where it was cooled to below 15° C.

The crystallization preventive properties of the sweeteners were effective in producing minute particles and dispersing of the lactose crystals present in the product. Therefore the product had a smooth palatability. The product was canned according to the usual methods.

EXAMPLE 2–l

Process for the production of sweetened powdered milk

Sweetened condensed whole milk was produced by purifying raw milk with clarifier after standardizing fat content and adding 40% of sweeteners K, M, B or A per milk before completion of evaporation. The mixture solution was condensed in vacuum at the lowest temperature possible to a concentration of D.S. 50% and pulverized with a spray drier. The spray drying was carried out with spray nozzle at 160° C. using parallel hot air. The resultant powder had a moisture content of 2–3%, a desirable sweetness without displaying the irritative taste of sucrose. The powdered milk has a favorable solubility to water and is most suitable for the infant milk.

EXAMPLE 2–m

Proess for the production of coffee milk

To 80 kg. of whole milk were added 9–15 kg. of the sweetener L, M, G or H, 700 g. of caramel, 60 ml. of essence and 20 kg. of coffee extract solution prepared separately by extracting 1.5 kg. of coffee with an extractor. The mixture was sterilized with a sterilizer used for ordinary milk processing, homogenized and bottled.

Lastly the product was sterilized by autoclaving the product at 120° C. for 15 minutes. The sweetener imparted to the product a sweetness which harmonized perfectly with the flavor of coffee and stimulated its bitterness, without reducing it.

EXAMPLE 2–n

Process for the production of peanut taffy 50 parts of sweetener K or B, 35 parts of the powdered sweetener A or J, 4 parts of shortening, 9 parts of peanut butter, and 2 parts of flour were used. The sweeteners K or B and A or J were dissolved in a small amount of warm water and mixed. To the mixture was added flour with heating and stirring, and was gelatinized thoroughly. Then the mixture was cooked in a steam pan equipped with a stirrer. At 155° C. shortening and peanut butter were added and emulsified sufficiently, then cooked to 120–125° C. and flavor was added. The resultant was poured and cooled on a cooling plate to 50–60° C. After cooling the product was cut with an automatic cutter and wrapped.

The caramel product had a decent sweetness, no deposit of crystals, relatively low viscosity and a taste that meets the requirement of today.

If preferable D.S. 10–20% of starch syrups may be added. The addition increases viscosity of the product.

EXAMPLE 2–o

Process for the production of biscuits

An example for soft biscuits is illustrated. 100 parts of soft flour, 6 parts of starch, 40 parts of the powdered sweetener C, J, or E, 15 parts of condensed milk, 10 parts of butter, 10 parts of shortening oil, 8 parts of egg, 0.3 part of salt, and 0.5 part of expander reagent were used. The sweetener and flour were dissolved gradually in a sufficient amount of water and kneaded completely in a mixer, to the softness of ear lobes. Immediately the mixture was placed into a stamping machine and then into an oven. The entrance and exit temperatures of the oven were kept 270° C. and 130° C. respectively. Baking was completed in 10 minutes.

The products had uniformed gloss, regular shapes and a feeling of better baking. In addition the products had a brittle hardness and dissolved readily with saliva. The soft sweetness of the products harmonized with the flavor of milk. Thus high quality biscuits were obtained.

EXAMPLE 2–p

Process for the production of sweet chocolate 40 parts of cacao paste, 10 parts of cacao butter, 49.5 parts of the powdered sweetener A, J, K or D, were mixed and induced into a refiner. The granules in the mixture were minuted sufficiently. Then the mixture was placed in a conche where it was kneaded at 50° C. for 2–3 days, and 0.5 part of lecithin was added during the kneading procedure and dispersed thoroughly. The resultant was adjusted to 31° C. with a temperature controller. Just before the cacao butter solidified, the mixture was induced into a molding machine and molded. After degassing the products with a vibrator, the products were passed through a cooling tunnel kept at 10° C. for 20 minutes and hardened. The products were recovered from the molds and wrapped. The products had a fine gloss, and a smooth internal texture. The products melted smoothly in the mouth. The sweetener was greatly effective in maintaining flavor and rendering a smooth texture and an improved palatability to the products, in addition preventing blooming.

EXAMPLE 2-q

Process for the production of canned fish

When unstable sugars, such as glucose, are used as a seasoning solution for canned fish, Strecker reaction of reducing sugars and nitrogenous compounds cause formation of carbonic acid gas. The gas causes expansion of cans, resulting in the output of a large amount of inferior canned goods, nevertheless the canned fish meat does not decompose. Because the sweetener comprises sucrose and a new non reducing sweetening substance, and has an extremely low reducing property, extremely preferable results can be obtained by using the sweetener in canned fish meat. The seasoning solution was prepared by dissolving the following ratio of ingredients: the sweetener B, J. or K:soy sauce:water are 45:40:20, by weight. 50 g. of the seasoning solution and 150 g. of fish meat was placed in a fully coated No. 6 size can and covered. The cans were exhauted by steaming for 20 minutes. Then, as before, the cans were seamed in vacuo under 20 mm. Hg pressure with a vacuum seamer. Immediately after heating and sterilizing at 8 p.s.i. for 1.5 hours the cans were cooled and thus the canned products were obtained. The products were compared with those in which common starch syrup with a D.E. of 45 were used. The results showed a great difference of gas formation; the gas formation of products using the sweetener was 4–6 ml., whereas the common starch syrup products were 38 ml. The products in which the sweetener was used had no fear of expansion due to gas formation. Thus the sweetener proved effective in maintaining the flavor of fish meat and in seasoning the products.

EXAMPLE 2-r

Process for the production of powdered juice (melon)

37 kg. of the powdered sweetener A, K or M, 500 g. of citric acid, 350 ml. of essence, 1 g. of coloring reagent (yellow No. 1) were mixed in water to give a Bx of 60° C. The mixture was sprayed dried. Another method involves mixing the powdered ingredients, then spraying a coloring solution onto the mixture and drying the colored resultant. The sweetness of the product is not excessive and harmonizes with the taste of organic acid. Thus a refreshing powdered juice is obtainable.

EXAMPLE 2-s

Process for the production of strawberry jam

Strawberries with cut off calyces and stems were washed in water. ⅓ part of the sweetener A or K was added to a part of the strawberries. Upon boiling and when the sacocarps swelled sufficiently the same amounts of the sweetener were added, and cooking was carried on until the mixture had a concentration of D.S. 25%. In other words the strawberries were first cooked in a thin sugar solution, with the increase of permeation of sugars into strawberries, the degree of sugar concentration was elevated to the finishing stage of 25%. The strawberries were cooked as quickly as possible to prevent fading. The product had a finer gloss than in the case when sucrose was used. The syrup had a decent sweetness. The reducing of solid was minimized and strawberries could keep their shapes well. Thus high quality jam was obtained.

EXAMPLE 2-t

Process for the production of wafers

Ingredients were as follows: 100 parts of flour, 10 parts of corn flour, 150 parts of milk, 1 part of expansion reagent and 50 parts of water. Flour dissolved with a small amount of milk was blended with the other ingredients and the remaining milk and a free flowing dough was prepared. The dough was poured onto a hot and thick molding plate and baked quickly in a wafer oven. Cashew wafers were produced according to the following method. To a 30% gelatin solution was added the sweetner solution of B, M, E or D, which was cooked to 120° C. Half crystallized sugar mixture obtained by agitating the above mentioned gelatin solution was applied to the wafer dough and then it was dried and cut. The sweeteners emphasized the taste of the wafers due to its soft sweetness and the great properties of holding moisture and flavor. In addition they improved the shelf lives of the products.

What we claim is:

1. A process for the production of foods and beverages comprising the steps of:
   subjecting a mixture of starch hydrolyzate and an acceptor selected from the group consisting of fructose, sucrose and mixtures thereof to the action of a transferring enzyme selected from the group consisting of fungal alpha-amylases and *Bacillus subtilis* saccharogenic alpha-amylases in an amount sufficient to transfer the glucose residuals of oligosaccharides present in the starch hydrolyzate to the acceptor, thus forming oligosaccharides which contain terminal fructose;
   purifying the resultant mixture of transferred sugars and intact sugars; and
   adding the resultant sugar mixture to foods and beverages in an amount sufficient to enhance or control the sweetness, flavor retention, chemical stability, nonhygroscopicity or viscosity thereof.

2. A process in accordance with claim 1 wherein the foods are canned fruits.

3. A process in accordance with claim 1 wherein the foods are candies.

4. A process in accordance with claim 1 wherein the foods are baked products.

5. A process in accordance with claim 1 wherein the food is coffee extract solution and the sweetener is added after an initial concentration to D.S. 30%, followed by a further concentration to D.S. 50% and freeze drying.

6. A process in accordance with claim 1 wherein the foods are instant soups.

7. A process in accordance with claim 1 wherein the food is sweetened milk.

8. A process in accordance with claim 1 wherein the food is canned fish.

9. A process according to claim 1 wherein said transferring enzyme is fungal α-amylase prepared from *Aspergillus niger*.

10. A process in accordance with claim 1, wherein said acceptor consists of fructose or a sugar mixture containing fructose, and further wherein said foods and beverages are ones which require high sweeteners and non-crystallization properties, and said amount of resultant sugar mixture added thereto is an amount sufficient to enhance the sweetness and control the crystallizability thereof.

11. A process in accordance with claim 1 wherein said acceptor consists of sucrose, and further wherein said foods and beverages are ones which require stability in the presence of nitrogen compounds and in the presence of heat treatment, and said amount of resultant sugar mixture added thereto is an amount sufficient to enhance the chemical stability thereof.

12. A process for the production of foods and beverages comprising the steps of:
   subjecting a mixture of starch hydrolyzate having a D.E. of at least 15 and an acceptor selected from the group consisting of fructose, sucrose, and mixtures thereof to the action of transferring enzyme of *Bacillus macerans* in an amount sufficient to transfer the glucose residuals of oligosaccharides present in the starch hydrolyzate to the acceptor, thus producing a cyclodextrin free syrup;

purifying the resultant syrup containing transferred sugars and intact sugars; and adding the resultant syrup to foods and beverages in an amount sufficient to enhance or control the sweetness, flavor retention, chemical stability, non-hydroscopicity or viscosity thereof.

References Cited

French et al.: J. Am. Chem. Soc., vol. 76, pp. 2387–90, 1954.

Bernfeld, P.: Adv. in Eng., vol. XII, Interscience Publishers, Inc., pp. 419–20, 1951.

Stanek: The Oligosaccharides, Academic Press, 1965, pp. 124–7.

LIONEL M. SHAPIRO, Primary Examiner

U.S. Cl. X.R.

99—142; 195—31 R